(12) United States Patent
Eppich

(10) Patent No.: US 6,644,950 B2
(45) Date of Patent: Nov. 11, 2003

(54) INJECTION MOULDING MACHINE

(75) Inventor: Stefan Eppich, Arbing (AT)

(73) Assignee: Engel Maschinenbau Gesellschaft m.b.H., Schwertberg (AT)

( * ) Notice: Subject to any disclaimer, the term of this patent is extended or adjusted under 35 U.S.C. 154(b) by 196 days.

(21) Appl. No.: 09/929,927

(22) Filed: Aug. 15, 2001

(65) Prior Publication Data

US 2002/0064574 A1 May 30, 2002

(30) Foreign Application Priority Data

Sep. 1, 2000 (AT) ......................................... 641/2000 U

(51) Int. Cl.[7] ............................................... B29C 45/84
(52) U.S. Cl. ........................ 425/151; 425/152; 425/153; 425/169; 425/214; 425/589
(58) Field of Search ................... 425/151, 152, 425/153, 169, 214, 589, 593

(56) References Cited

U.S. PATENT DOCUMENTS

| | | | | |
|---|---|---|---|---|
| 3,386,133 A | * | 6/1968 | Weiner | 425/153 |
| 3,728,057 A | * | 4/1973 | Grundmann et al. | 425/151 |
| 3,804,003 A | * | 4/1974 | Hehl | 425/152 |
| 6,062,843 A | | 5/2000 | Yamaura | |

FOREIGN PATENT DOCUMENTS

JP         9141717         6/1997

* cited by examiner

Primary Examiner—James P. Mackey
(74) Attorney, Agent, or Firm—Notaro & Michalos P.C.

(57) ABSTRACT

An injection moulding machine comprising a mould mounting plate movable by an electric motor (3) by means of a closing device (1). There is provided a guard grille (4) having a gate (5), the opening of which interrupts the power supply to the electric motor (3) by actuation of at least one safety switch (6, 7, 8). There is also provided a braking device (10). The braking device (10) is arranged between the electric motor (3) and the closing device (1) and is provided with a monitoring device (29).

10 Claims, 5 Drawing Sheets

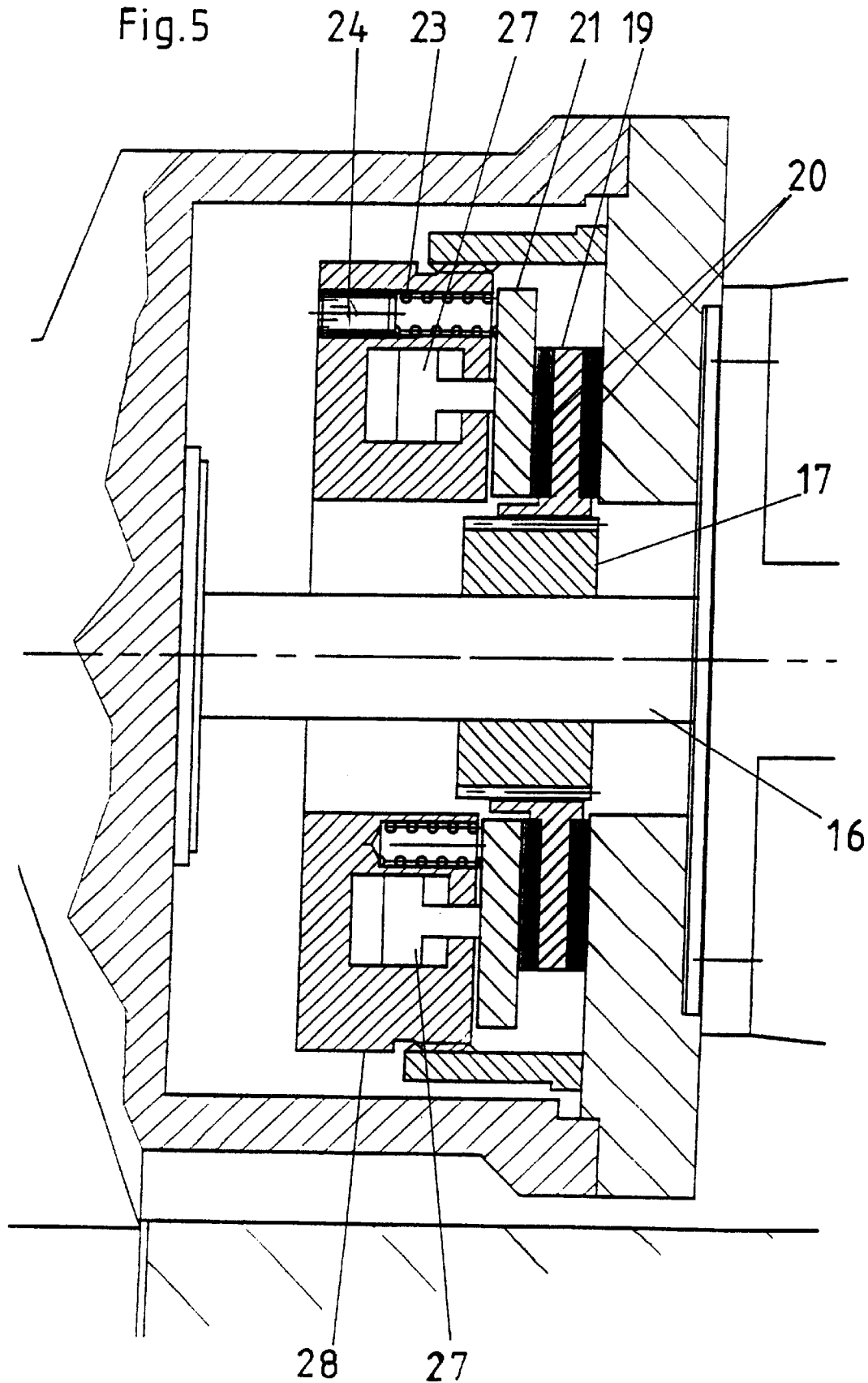

INJECTION MOULDING MACHINE

The invention relates to an injection moulding machine comprising a mould mounting plate movable by an electric motor by means of a closing device, a guard grille with a gate, the opening of which interrupts the power supply to the electric motor by actuation of at least one safety switch, and a braking device.

Injection moulding machines must be provided with a safety device which prevents the movable mould mounting plate from closing if the guard grille is opened or is not correctly closed.

In an injection moulding machine in which the drive for the movable mould halves is by way of an electric motor, the object of the invention is to afford an improved closing safeguard.

The object of the invention is attained in that the braking device is arranged between the electric motor and the closing device and is provided with a monitoring device.

A preferred embodiment provides that there is a further braking device. In that case a braking device as stated is arranged between the electric motor and the closing device and preferably engages the drive output shaft of the electric motor while the second brake engages a shaft of the electric motor, which projects out of the motor casing at the opposite side.

An embodiment provides that there is a device for limit position monitoring of the braking device or the braking devices.

A further embodiment provides that the braking device or the braking devices is or are moved into the braking position by springs and is or are moved into the release position by the actuation of the at least one limit switch by at least one activation device, wherein preferably the activation device is in the form of an electromagnetic or pneumatic device.

An embodiment of the invention is described hereinafter with reference to the Figures of the accompanying drawings.

FIG. 1 shows an end view of the drive side of an injection moulding machine,

FIG. 2 diagrammatically shows the closing safeguard,

FIG. 5 shows a section through a further embodiment of the braking device.

Figure 1:
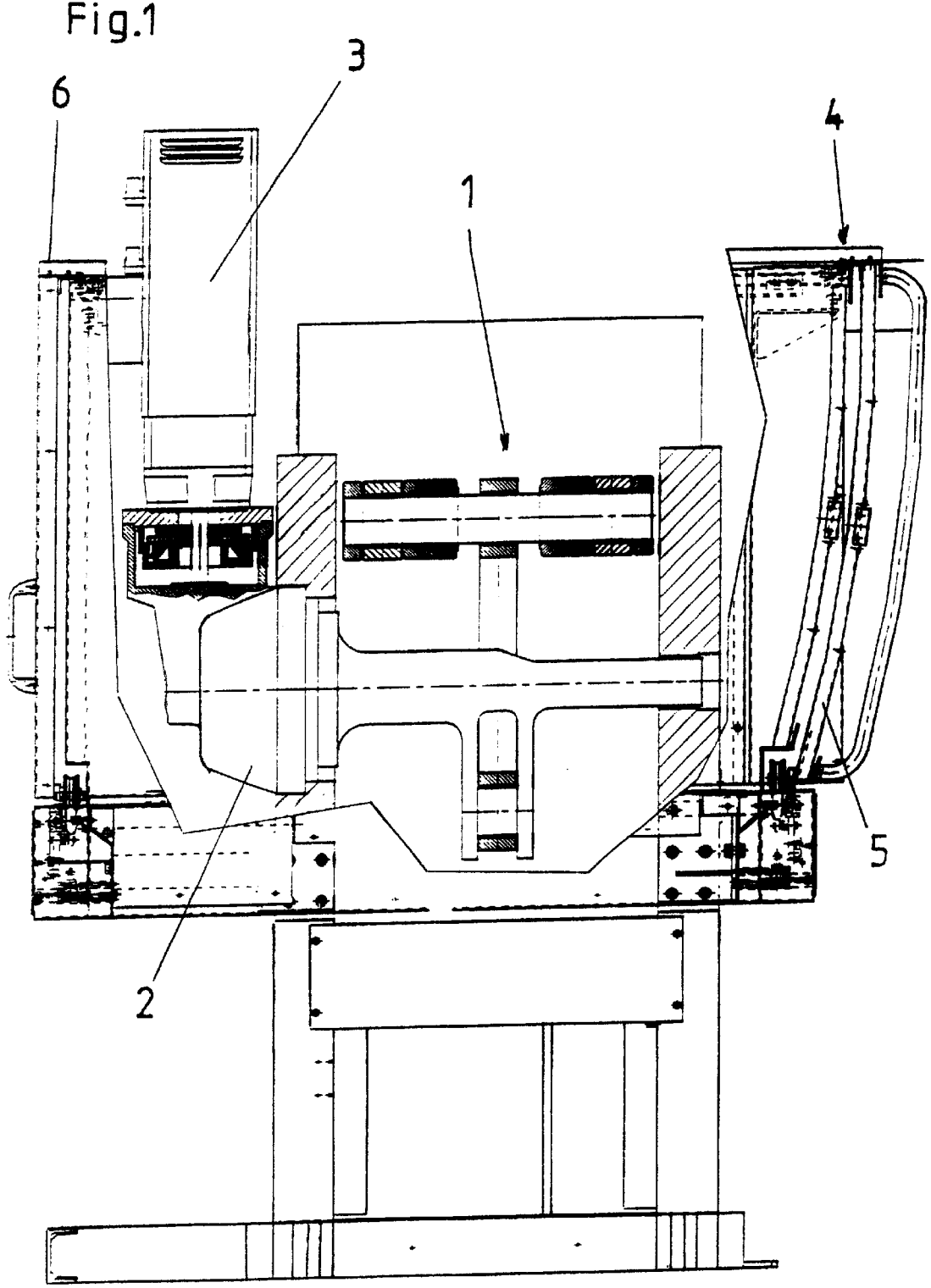

The injection moulding machine according to the invention has a closing device 1 for a movable mould mounting plate, which is connected by way of a drive transmission assembly 2 to an electric motor 3, preferably a servo motor. At the operating side, the injection moulding machine is provided with a guard grille 4 which has at least one gate 5.

At the rear side, the injection moulding machine is provided with a further gate 6 which is safeguarded just like the front gate 5, but which is opened preferably only for maintenance operations.

Figure 2:
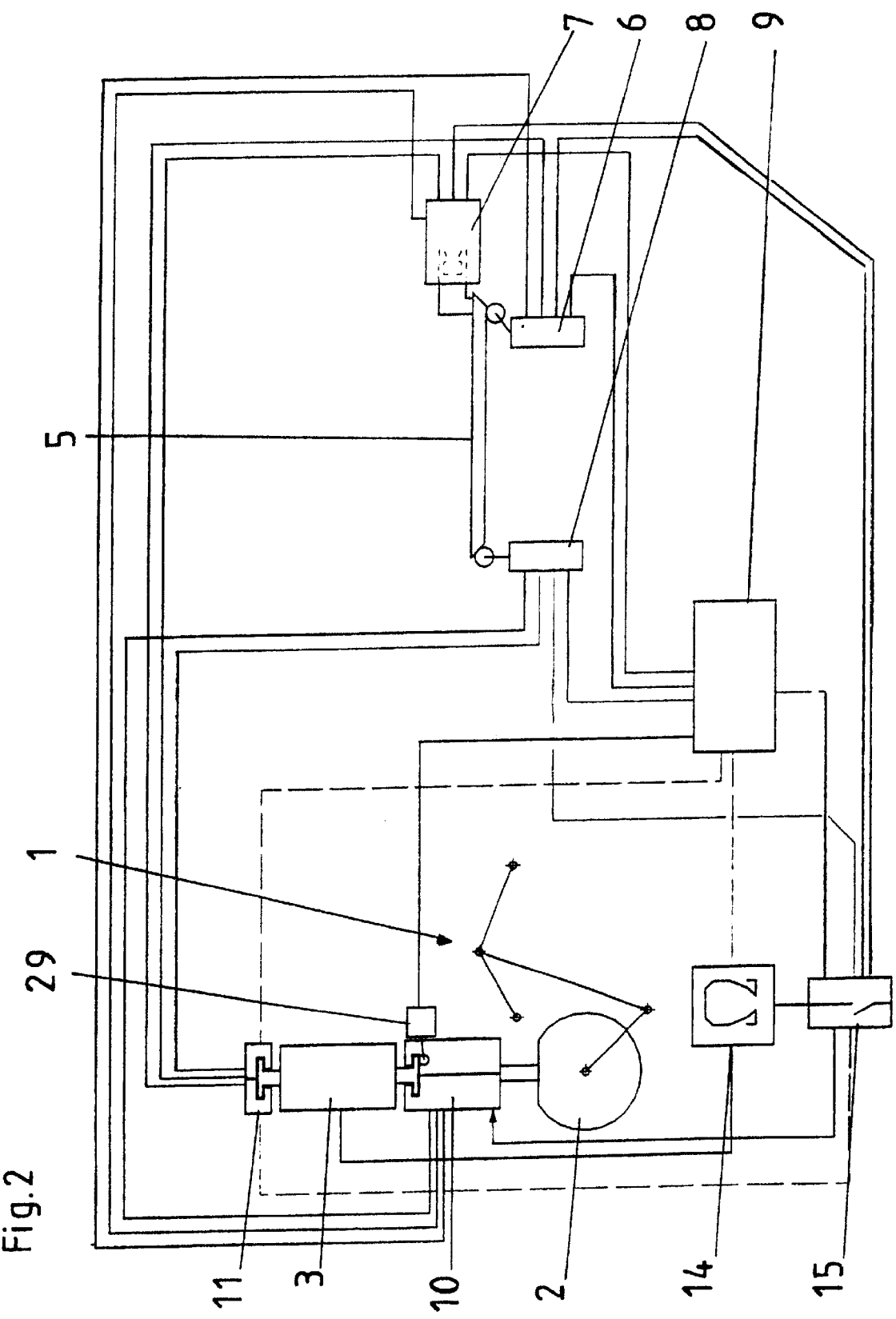

As can be seen from FIG. 2, the gate 5 is safeguarded by three safety switches 6, 7 and 8. The safety switches 6, 7 and 8 are connected by way of a control 9 to two braking devices 10 and 11.

The braking device 10 is disposed between the electric motor 3 and the drive transmission assembly 2 for the closing device 1 and engages the drive output shaft 16 of the electric motor 3. A further braking device 11 engages a disc or shaft which projects at the rear end of the electric motor 3.

Mounted on the drive output shaft 16 is an entrainment wheel 17 which is coupled by way of a multi-spline profile 18 to a brake disc 19. Arranged on both sides of the brake disc 19 are brake linings or pads 20, the brake pads 20 can be fixed both to the brake disc 19 and also to an adjacent pressure disc 21 or a cover plate 22 of the braking device 10, on the motor side.

The pressure disc 21 is acted upon by springs 23 which urge the pressure disc 21 continuously into the braking position. If therefore no energy is supplied to the braking device the electric motor 3 and the drive transmission assembly 2 are automatically braked. Screwthreaded pins 24 are provided, by means of which the braking force of the springs 23 can be adjusted.

Figure 3:
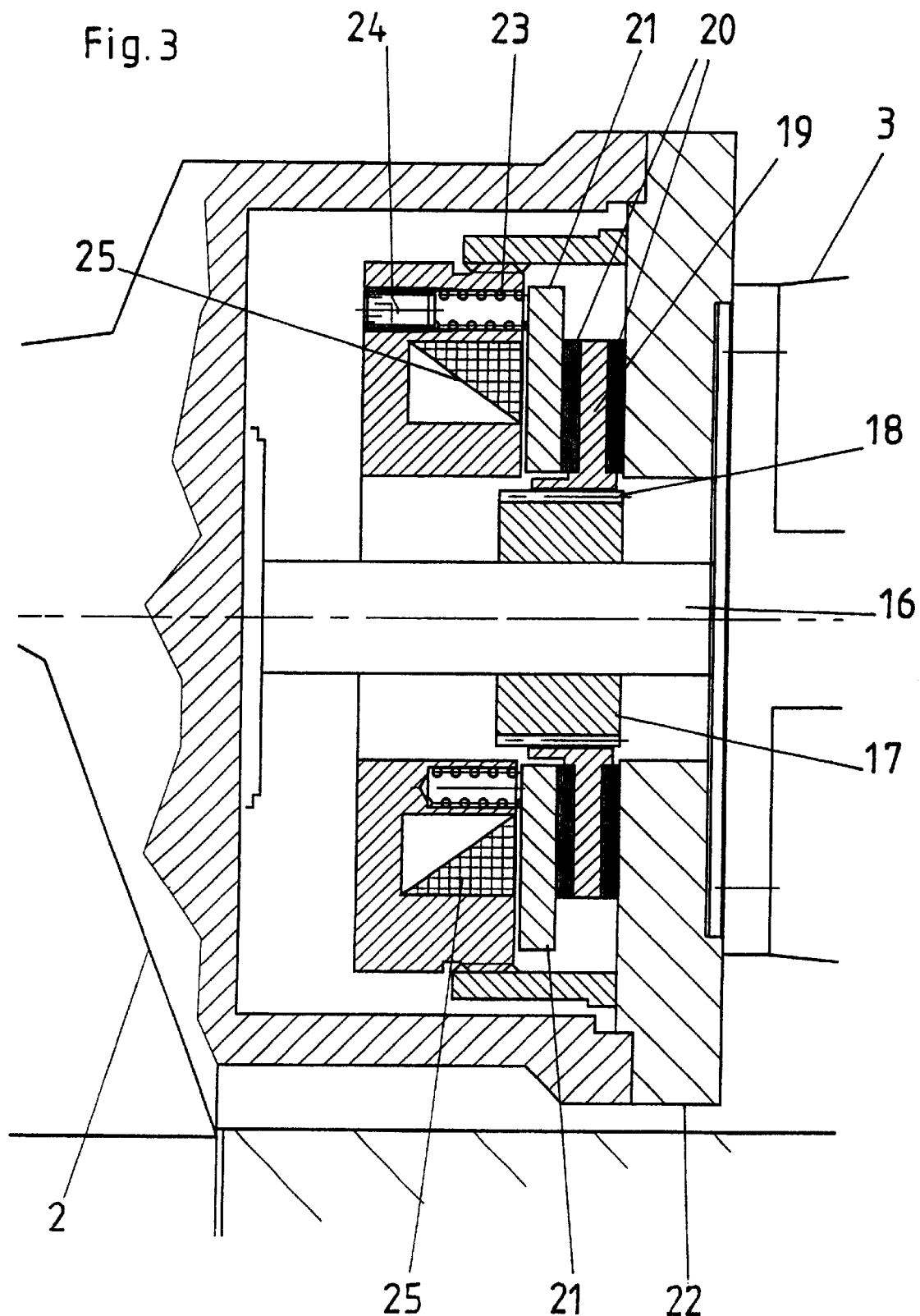
FIG. 3 is a view in section through an embodiment of the braking device.
Figure 4:
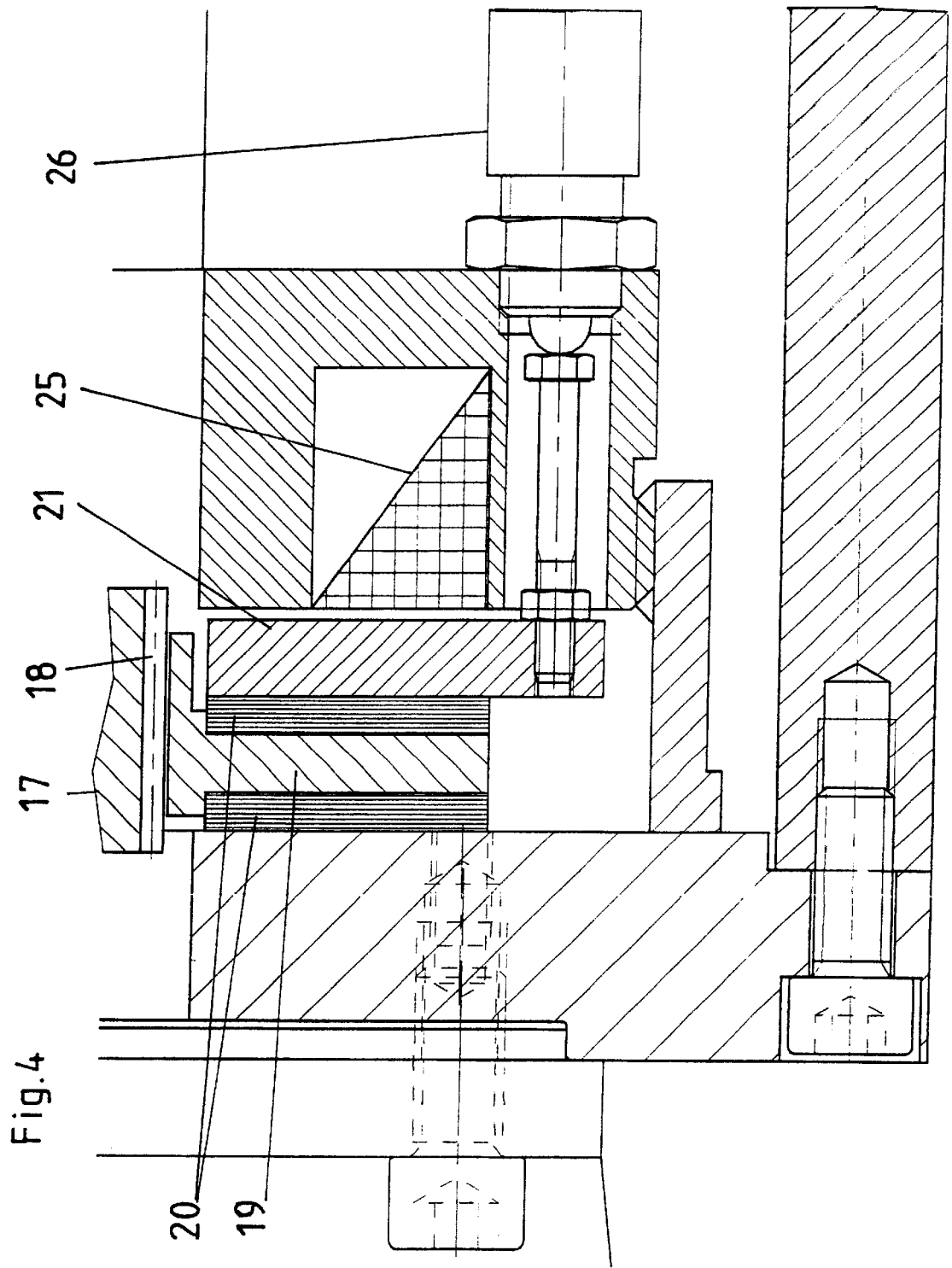
FIG. 4 shows a portion of the braking device of FIG. 3 on an enlarged scale.

In the embodiment shown in FIGS. 3 and 4 the pressure disc 21 is engaged by an electromagnet 25, upon the activation of which the pressure disc 21 is lifted off the brake pads 20 in the brake disc 19.

The arrangement includes a monitoring device 29 having a limit switch 26, the monitoring device 29 monitoring the movement of the pressure disc 21.

When the electromagnet 25 is activated the brake disc 19 is released and the closing mechanism 1 can be actuated by way of the drive transmission assembly 2 by the electric motor 3.

In the embodiment shown in FIG. 5 a pneumatic device 28 having a pneumatic piston 27 is used for opening the braking device. The pressure disc 21 is lifted off the brake disc 19 with the brake linings or pads 20 by the pneumatic piston 27, just as in the above-described embodiment. In that operation, a pneumatic valve is activated by way of the control device 9. In this case also the actual braking effect, that is to say blocking of the rotary movement of the rotor of the electric motor 3, is effected by the pressure disc 21 being acted upon by the springs 23.

The arrangement also has a servo regulator 14 and a mains network protection unit 15.

What is claimed is:

1. An injection moulding machine comprising a mould mounting plate movable by an electric motor by means of a closing device, a guard grille with a gate, the opening of which interrupts the power supply to the electric motor by actuation of at least one safety switch, and a braking device, characterised in that the braking device (10) is arranged between the electric motor (3) and the closing device (1) and is provided with a monitoring device (29).

2. An injection moulding machine according to claim 1 characterised in that the braking device (10) is arranged between the electric motor (3) and a drive transmission assembly (2) of the closing device (1).

3. An injection moulding machine according to claim 1 characterised in that the monitoring device (29) includes a limit switch (26).

4. An injection moulding machine according to claim 1 characterised in that there is provided a further braking device (11).

5. An injection moulding machine according to claim 1 characterised in that the braking device (10) or the braking devices (10, 11) is or are moved into the braking position by springs (23) and is or are moved into the release position by the actuation of at least one activation device.

6. An injection moulding machine according to claim 5 characterised in that the activation device is in the form of an electromagnetic or pneumatic device (25, 26).

7. An injection moulding machine according to claim 5 characterised in that the at least one activation device is connected to the at least one safety switch (6, 7, 8).

8. An injection moulding machine according to claim 1 characterised in that the braking device (10) arranged between the electric motor (3) and the drive transmission assembly (2) engages the drive output shaft (16) of the electric motor (3).

9. An injection moulding machine according to claim 1 characterised in that a servo motor is used as the electric motor (3).

10. An injection moulding machine according to claim 1 characterised in that the electric motor (3) and the braking device (10) or the braking devices (10, 11) are connected by way of a common control device (14) to the safety switches (6, 7, 8) for the gate (5) of the guard grille (4).

* * * * *